United States Patent
Greenberg

(10) Patent No.: US 7,616,264 B1
(45) Date of Patent: Nov. 10, 2009

(54) CROPPED AND SCALED PICTURE-IN-PICTURE SYSTEM AND METHOD

(75) Inventor: Robert Y. Greenberg, Portland, OR (US)

(73) Assignee: Pixelworks, Inc., Tualatin, OR (US)

( * ) Notice: Subject to any disclaimer, the term of this patent is extended or adjusted under 35 U.S.C. 154(b) by 703 days.

(21) Appl. No.: 11/006,019

(22) Filed: Dec. 6, 2004

(51) Int. Cl.
*H04N 9/74* (2006.01)
*H04N 5/45* (2006.01)
*H04N 5/445* (2006.01)

(52) U.S. Cl. .................. 348/584; 348/598; 348/600; 348/565; 348/564

(58) Field of Classification Search .............. 348/584, 348/588, 586, 589, 598–600, 563–568, 561, 348/581, 582, 448, 569; H04N 9/74, 5/445, H04N 5/45, 7/01, 5/50
See application file for complete search history.

(56) References Cited

U.S. PATENT DOCUMENTS

| | | | | |
|---|---|---|---|---|
| 4,602,286 A * | 7/1986 | Kellar et al. | ............ | 348/584 |
| 5,040,067 A * | 8/1991 | Yamazaki | ............ | 348/588 |
| 6,020,931 A * | 2/2000 | Bilbrey et al. | ............ | 348/584 |
| 6,678,006 B1 * | 1/2004 | Velez et al. | ............ | 348/564 |
| 6,778,224 B2 * | 8/2004 | Dagtas et al. | ............ | 348/586 |
| 6,874,145 B1 * | 3/2005 | Ye et al. | ............ | 718/108 |
| 7,050,113 B2 * | 5/2006 | Campisano et al. | ....... | 348/581 |
| 7,187,418 B2 * | 3/2007 | Phillips et al. | ............ | 348/565 |
| 7,280,158 B2 * | 10/2007 | Matsubara | ............ | 348/598 |
| 7,292,284 B2 * | 11/2007 | Kim | ............ | 348/564 |
| 7,453,520 B2 * | 11/2008 | Kim | ............ | 348/563 |
| 7,463,307 B2 * | 12/2008 | Cheng | ............ | 348/448 |
| 2002/0184632 A1 * | 12/2002 | Reitmeier | ............ | 348/565 |

\* cited by examiner

*Primary Examiner*—Sherrie Hsia
(74) *Attorney, Agent, or Firm*—Marger Johnson & McCollom, P.C.

(57) ABSTRACT

We describe a cropped and scaled picture-in-picture system and method. The video system includes a first video port to generate a first video signal portion from a first video signal, a second video port to generate a second video signal portion from a second video signal, and a video processor to generate a composite image from the first and second video signal portions.

25 Claims, 4 Drawing Sheets

CROPPED AND SCALED PICTURE-IN-PICTURE SYSTEM AND METHOD

BACKGROUND

A display simultaneously showing two independent video signals or images, such as a television showing two different channels, is commonly known as a Picture-In-Picture (PIP) display. There are many PIP systems relating to display systems and televisions in particular. Typical PIP systems merge two video signals into a single signal, where, for example, an entire image from a second video signal is shown in a window of a first video signal. The PIP display, therefore, shows the second video image overlaying the first video image. The small scale of the overlaying, or second, image makes viewing its details difficult.

FIG. 1 shows a display of a first video image 10 from a first video signal and a second video image 20 from a second video signal. The first video image 10 may be from a main channel that a viewer wishes to primarily see. The second video image 20 may be from a secondary channel that the viewer merely wishes to superficially monitor. An example of a program on the secondary channel is a financial news show. The images 10 and 20 may temporally change according to the content of the corresponding signal.

In FIG. 2, both video signals are combined as a composite image 30 or PIP display 30, with the second video image 20 over-laying the first video image 10. In FIG. 2, the entire first and second video images 10 and 20 are displayed, although a portion of the first video image 10 is obscured by the overlaying second video image 20, either completely or partially by alpha blending. The area of the first video image 10 that is obscured by the second video image 20 may be reduced if the area of the second video image 20 is made smaller. The conventional art can allow the second video image 20 to be smaller, but unfortunately its concomitant image is smaller and more difficult to see.

Another shortcoming of the conventional art is that a viewer may not want to waste valuable display area on parts of an image that are of no interest. It is highly inefficient to display unwanted parts of a video image at the expense of displaying desired parts.

Accordingly, a need remains for an improved cropped and scaled PIP system and method.

DETAILED DESCRIPTION OF THE EMBODIMENTS

In a composite or PIP video system, it may be desirable to scale and/or crop, or clip, either image so that valuable display real estate is efficiently utilized. For example, perhaps only a bottom half of an overlaying video image is needed for viewing. If this is carried out, then two possible benefits arise: either the overlaying video image takes up half its original area, thereby halving the obstructed area of the other video image, or the scale of the overlaying video image is doubled, allowing easier viewing.

An embodiment of the invention is a video system that is able to merge only a portion of a first video image in a first video signal with a second video image in a second video signal. The second video signal may also be a portion of an original video signal.

In another embodiment of the invention, two or more video signals are merged together. However, instead of merging entire video signals, only portions of these video signals are stored and merged. Any of the video signals may be scaled as needed to produce more effective results. For example, a side-by-side display of the video signals can be produced, as well as any other display configuration.

In yet another embodiment of the invention is the "always-on-top stock ticker". For a television system with two tuners, one tuner is used for a first channel being watched. The other tuner tunes to a second channel, which may show a financial station. Regarding the second channel, only the lower portion of the image, which may contain a real-time stock ticker, is stored. This stock ticker is then merged with the first channel to form a composite image so that regardless of what channel is being watched, one can always see the stock ticker at the bottom of the screen—even though the composite display comprises information from two different channels.

Figure 1:
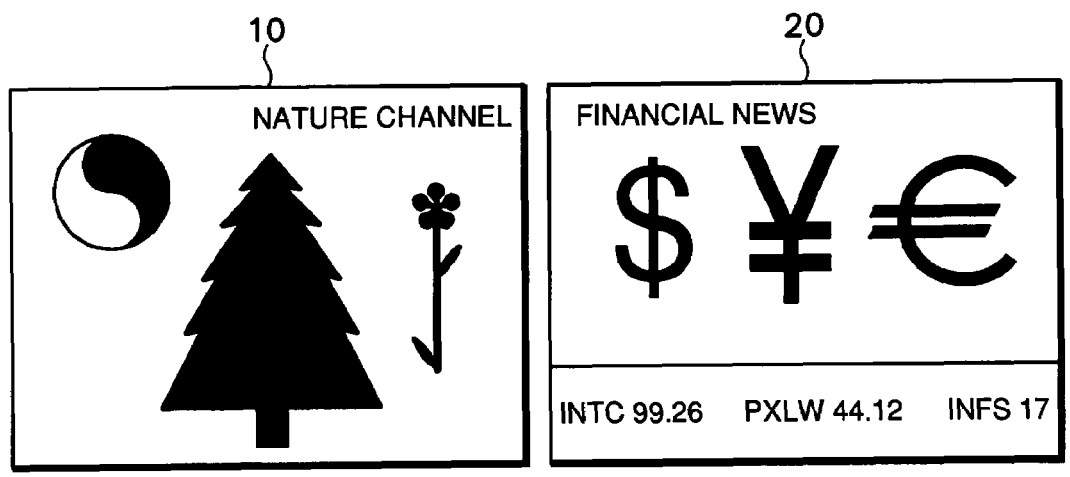
FIG. 1 shows the first and second video images.
Figure 2:
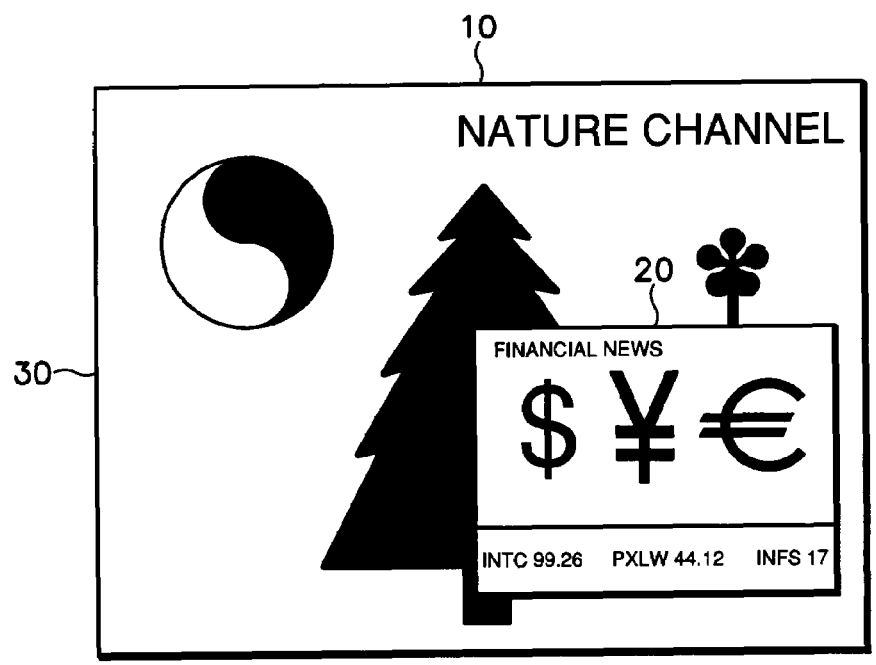
FIG. 2 shows the first and second video images merged into a composite video image according to a conventional art.
Figure 3:
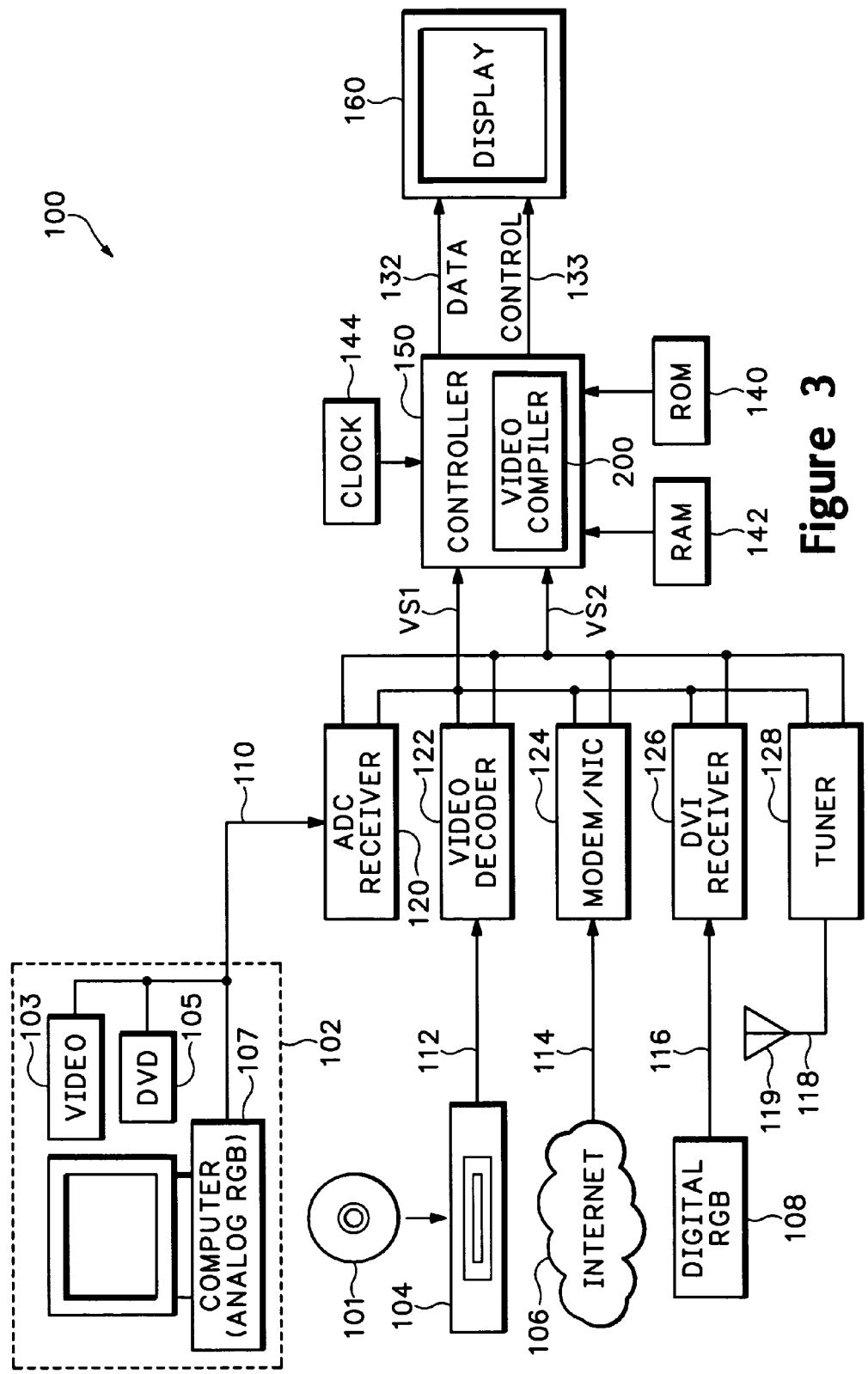
FIG. 3 is a block diagram of a display system according to an embodiment of the invention.

FIG. 3 is a block diagram of a display system 100. FIG. 3 shows several video signal sources that will be generated into digital first video signal VS1 and second video signal VS2. In the following embodiments the respective video signal sources for VS1 and VS2 may be independent of each other. For example, VS1 may be derived from a DVD player 104, and VS2 may be derived from an antenna 119, or both VS1 and VS2 may be derived from the antenna 119, and so on.

Referring to FIG. 3, the system 100 includes a receiver 120 for receiving an analog image data signal 110, e.g., an RGB or $YP_BP_R$ signal, from a source 102. The source 102 may be a personal computer 107, a digital video disk player 105, set top box (STB) 103, or any other device capable of generating the analog image data signal 110. The receiver 120 may be an analog-to-digital converter (ADC) or any other device capable of generating first and second digital video signals, VS1 and VS2, respectively, from the analog image data 110. The receiver 120 converts the analog image data signal 110 into the digital video signals VS1 and VS2 and provides it to a controller 150. A person of reasonable skill in the art knows well the design and operation of the source 102 and the receiver 120.

Likewise, a video receiver or decoder 122 decodes an analog video signal 112 from a video source 104. The video source 104 may be a video camcorder, tape player, digital video disk (DVD) player, or any other device capable of generating the analog video signal 112. The video source 104 may read (or play) external media 101. In an embodiment, a DVD player 104 plays the DVD 101. In another embodiment, a VHS tape player 104 plays a VHS tape 101. The decoder 122 converts the analog video signal 112 into the digital video signals VS1 and VS2 and provides it to the controller 150. The decoder 122 is any device capable of generating digital video signals VS1 and VS2, e.g., in Y/C or CVBS format, from the analog video signal 112. A person of reasonable skill in the art knows well the design and operation of the video source 104 and the video decoder 112.

A modem or network interface card (NIC) 124 receives data 114 from a global computer network 106 such as the Internet®. The data 114 may be in any format capable of transmission over the network 106. In an embodiment, the data 114 is packetized digital data. But the data 114 may also be in an analog form. Likewise, the modem 124 may be a digital or analog modem or any device capable of receiving data 114 from a network 106. The modem 124 provides digital video signals VS1 and VS2 to the controller 150. A person of reasonable skill in the art knows well the design and operation of the network 106 and the modem/NIC 124.

A Digital Visual Interface (DVI) or high definition multimedia interface (HDMI) receiver 126 receives digital signals 116 from a digital source 108. In an embodiment, the source 108 provides digital RGB signals 116 to the receiver 126. The receiver 126 provides digital video signals VS1 and VS2 to the controller 150. A person of reasonable skill in the art knows well the design and operation of the source 108 and the receiver 126.

A tuner 128 may receive a wireless signal 118 transmitted by the antenna 119. The antenna 119 is any device capable of wirelessly transmitting or broadcasting the signal 118 to the tuner 128. The antenna may also represent cable, satellite, or any other transmissible digital or analog input. In an embodiment, the antenna 119 transmits a television signal 118 to the television tuner 128. The tuner 128 may be any device capable of receiving a signal 118 transmitted wirelessly by any other device, e.g., the antenna 119, and of generating the digital video signals VS1 and VS2 from wireless signals 118. The tuner 128 provides the digital video signals VS1 and VS2 to the controller 150. A person of reasonable skill in the art knows well the design and operation of the antenna 119 and the tuner 128.

The digital video signals VS1 and VS2 may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals are processed separately and, ideally, encoding into a composite video signal occurs only once, prior to transmission. The digital video signals VS1 and VS2 may be signals of digital numbers describing a continuous analog video waveform in either composite or component form. FIG. 3 describes a variety of devices (and manners) in which the digital video signals VS1 and VS2 may be generated from respective analog video signals or other sources. A person of reasonable skill in the art should recognize other devices for generating the digital video signals VS1 and VS2 come within the scope of the invention.

The controller 150 generates composite image data 132 and control signals 133 by manipulating the digital video signals VS1 and VS2. The controller 150 provides the image data 132 and control signals 133 to a display device 160. The display device 160 includes a pixelated display that has a fixed pixel structure. Examples of pixelated displays are active and passive LCD displays, CRTs, plasma displays (PDP), field emissive displays (FED), electro-luminescent (EL) displays, micro-mirror technology displays, low temperature polysilicon (LTPS) displays, and the like. A person of reasonable skill in the art should recognize that display device 160 may be a television, monitor, projector, personal digital assistant, and other like applications.

In an embodiment, the controller 150 may scale the digital video signals VS1 and VS2 for display by the display device 160 using a variety of techniques including pixel replication, spatial and temporal interpolation, digital signal filtering and processing, and the like. In another embodiment, the controller 150 may additionally change the resolution of the digital video signals VS1 and VS2, changing the frame rate and/or pixel rate encoded in the digital video signals VS1 and VS2. Scaling, resolution, frame, and/or pixel rate conversion are not central to this invention and are not discussed in further detail.

The controller 150 includes a video compiler 200 for cropping, scaling, and finally merging the received video signals 109 and 209. The video compiler 200 provides image data 132 to the display device 160. The video compiler 200 may be integrated into a monolithic integrated circuit or hardwired using any number of discrete logic and other components. Alternatively, the controller 150 may be a dedicated processor system that includes a microcontroller or a microprocessor to implement video compiler 200 as a software program or algorithm.

Read-only (ROM) and random access (RAM) memories 140 and 142, respectively, are coupled to the controller 150 and store bitmaps, FIR filter coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100. A person of reasonable skill in the art should recognize that the ROM and RAM memories 140 and 142, respectively, may be external or internal to the controller 150. RAM memory 142 may be a flash type memory device. Clock 144 controls timing associated with various operations of the controller 150.

Figure 4:
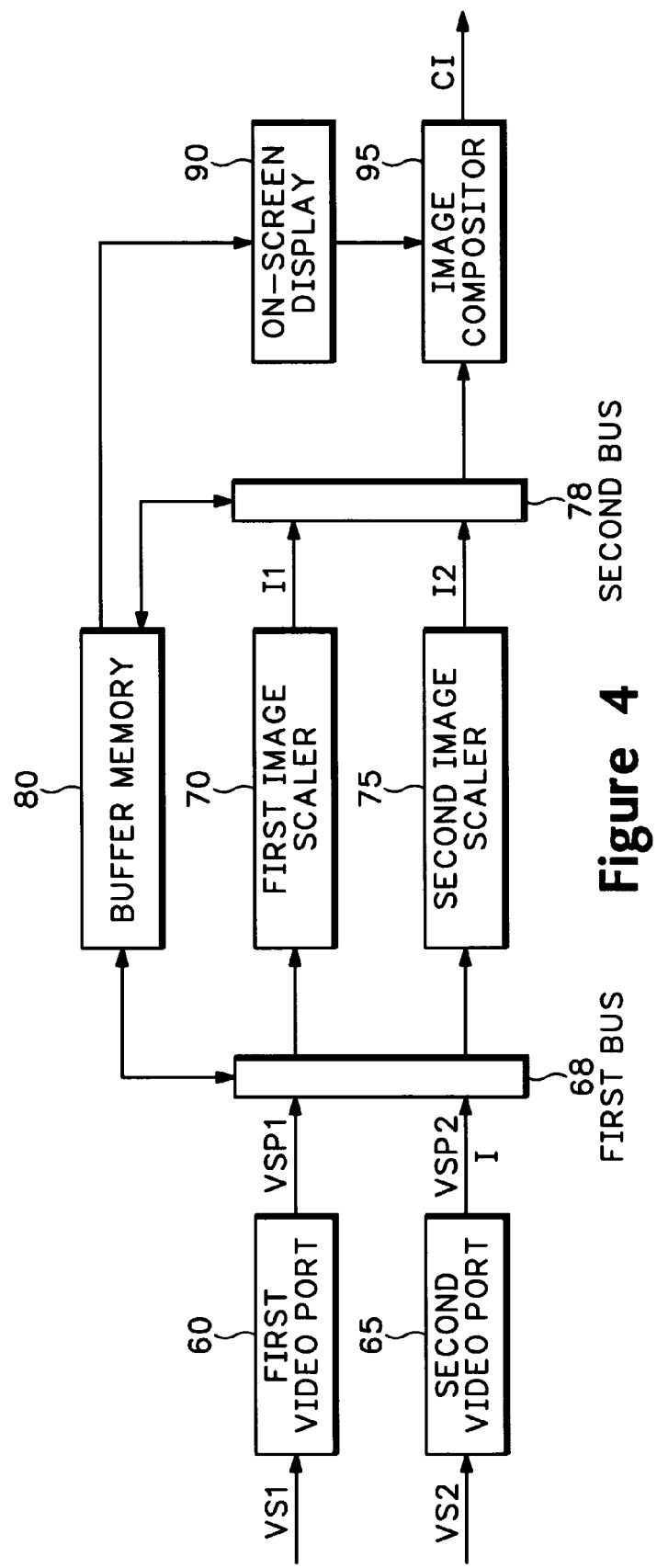
FIG. 4 is a block diagram of a video compiler according to an embodiment of the invention.

FIG. 4 shows details of the video compiler 200, according to an embodiment of the invention. As shown in FIG. 4, a first video port 60 receives the first video signal VS1, and subsequently outputs a first video signal portion VSP1. Similarly, a second video port 65 receives the second video signal VS2, and subsequently outputs a second video signal portion VSP2. The first video port 60 removes, or clips, a part of the first video signal VS1, leaving a first video signal portion VSP1 that is subsequently output to a first bus 68. The portion of the first video signal VS1 that is clipped may vary, e.g., from zero to one hundred percent. In other words, depending on user preference, the first video port 60 may not clip any part (zero percent clipping) of the first video signal VS1, subsequently outputting the entire first video signal VS1 as the first video signal portion VSP1.

The second video port 65 removes, or clips, a part of the second video signal VS2, leaving a second video signal portion VSP2 that is subsequently output to the first bus 68. The portion of the second video signal VS2 that is clipped may vary, e.g., from zero to one hundred percent. In other words, depending on user preference, the second video port 65 may not clip any part (zero percent clipping) of the second video signal VS2, subsequently outputting the entire second video signal as the second video signal portion VSP2.

There are a variety of well known clipping technologies that may be used. The first and second video ports 60 and 65 may be distinct or a single clipping circuit, and may be part of the controller 150. The video ports 60 and 65 are well known in the art and it will not be discussed in further detail.

In FIG. 4 first and second video signal portions VSP1 and VSP2 are input, via the first bus 68, into a first image scaler 70 and a second image scaler 75, respectively, and optionally into a buffer memory 80. The first image scaler 70, according to user preference, scales the overall size of the first video signal portion VSP1. Likewise, the second image scaler 75 scales the overall size of the second video signal portion VSP2. The first and second image scalers 70 and 75 may also deinterlace the first and second video signal portions, respectively, as necessary to support the signal's viewing on the display device 160. Alternatively, the controller 150 may deinterlace the first and second video signals, and may also deinterlace the composite signal, which is a signal that is explained below. In any case, deinterlacing is well known in the art and it will not be discussed in further detail.

The first and second scalers 70 and 75 may scale the first and second signal portions VSP1 and VSP2, respectively, using a variety of well known scaling technologies, including pixel replication, spatial and temporal interpolation, digital signal filtering and processing, and the like. The first and second scalers 70 and 75 may be distinct or a single scaler circuit, and may be part of the controller 150. The scalers 70 and 75 are well known in the art and will not be discussed any further.

As shown in FIG. 4 the first image scaler 70 outputs a first image signal I1 that is a clipped and scaled video signal of the original video signal VS1. Similarly, the second image scaler 75 outputs a second image signal I2 that is a clipped and scaled video signal of the original video signal VS2. Both outputs I1 and I2 are available on a second bus 78 to be received by an image compositor 95, and optionally the buffer memory 80. An on-screen display circuit 90 may receive output from the buffer memory 80. The on-screen display circuit 90 may introduce a user menu onto the composite video image 30 that is displayed, allowing the user to input a viewing preference. Such menu items may be the relative image position of the two video signal displays, the relative scale of the two video signal displays, and the amount of clipping of each video signal display. Implementation of on-screen display circuits 90 are well known in the art and will not be discussed in further detail.

The image compositor 95 may also clip the video signals VS1 and VS2. In addition, the image compositor 95 may combine, or merge, the first image signal I1, the second image signal I2, and the on-screen display user menu into a composite image signal CI, using various techniques that are well known in the art which will not be discussed in detail. Consequently, the composite image signal CI is made available to the controller 150, which in turn outputs image data 132. Finally, the composite video image 30 may be displayed by the display device 160.

Figure 5:
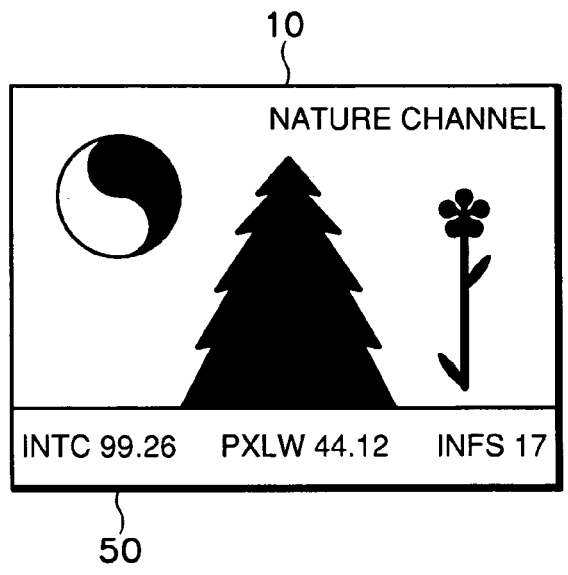
FIG. 5 shows the first and second video images merged into a composite video image according to an embodiment of the invention.

An embodiment of the invention is shown in FIG. 5, in which a portion of the second video image 20 is now a clipped second video image 50, and over-lays the first video image 10. In FIG. 5 a real-time stock ticker that was a portion of the second video image 20 is now what remains as the clipped second video image 50. In this embodiment a portion of the second video signal 20 that is preferred to be viewed may be made to remain in the final composite image, thus avoiding a waste of valuable display area.

Figure 6:
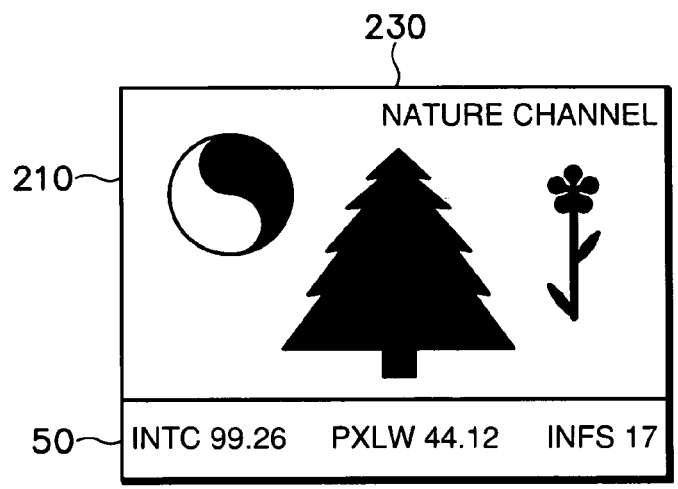
FIG. 6 shows the first and second video images merged into a composite video image according to another embodiment of the invention.

FIG. 6 shows an embodiment of the invention. The first video image 10 is not clipped, but is scaled to become image 210. The first video image 10 is scaled in such a way as to allow clipped second video image 50 to display adjacent to, not overlaying, the image 210. Therefore, the composite video image 230 does not include any image overlaying, thus avoiding an obscured image.

Figure 7:
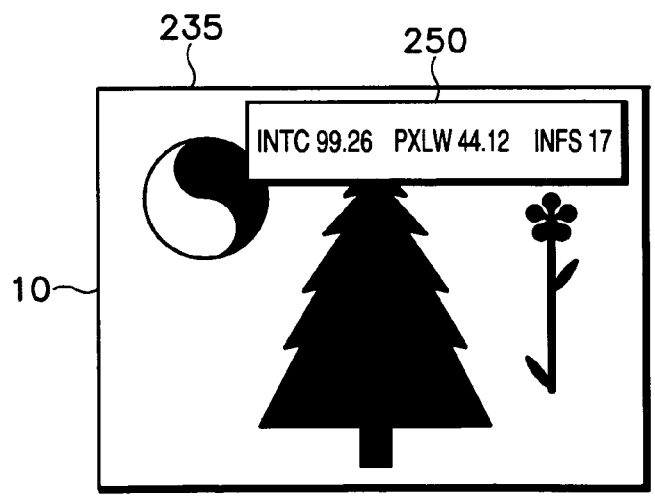
FIG. 7 shows the first and second video images merged into a composite video image according to another embodiment of the invention.

FIG. 7 shows another embodiment of the invention. The first video image 10 is neither scaled nor clipped. However, the second video image 20 is clipped and scaled to fit into a corner of the composite image 235. In other words, clipped second video image 50 is scaled to become image 250. A portion of the first video image 10 is obscured by the image 250, but the user may choose to scale either video signal, and/or place either video signal in a location that is most convenient.

Embodiments of the invention may include an article comprising a storage medium, the storage medium having stored instructions, that, when executed by a machine cause the machine to perform the method of the invention.

Having illustrated and described the principles of the invention, it should be readily apparent to those skilled in the art that the invention can be modified in arrangement and detail without departing from such principles. All modifications are claimed that come within the spirit and scope of the accompanying claims.

What is claimed is:

1. A video system comprising:
   a first video port to generate a first video signal portion from a first video signal, where the first video port clips a portion of the first video signal to generate the first video signal portion and where the first video signal is from a first channel;
   a second video port to generate a second video signal portion from a second video signal, where the second video signal is from a second channel;
   an on-screen display circuit configured to provide a user menu; and
   a video processor to generate a composite image from the first and second video signal portions and the user menu, where the user menu is configured to receive an input of a viewing preference from a user, the viewing preference including at least one of a relative position of the first and second video signal portions in the composite image, a relative scale of the first and second video signal portions in the composite image, and an amount of clipping of the first and second video signal portions.

2. The video system of claim 1 where the video processor includes:
   a first image scaler to scale the first video signal portion; and
   a second image scaler to scale the second video signal portion.

3. The video system of claim 1, where the first video signal portion is a stock ticker.

4. A video system comprising:
   a first video port to generate a first video signal portion from a first video signal;
   a second video port to generate a second video signal portion from a second video signal;
   a first image scaler to scale the first video signal portion, where the first image scaler deinterlaces the first video signal portion;
   a second image scaler to scale the second video signal portion, where the second image scaler deinterlaces the second video signal portion;

an on-screen display circuit configured to provide a user menu; and a video processor to generate a composite image from the first and second scaled video signal portions and the user menu.

5. The video system of claim 4 comprising a memory to store the first or second video signal portions.

6. The video system of claim 4 where the first video signal portion is a stock ticker.

7. The video system of claim 4 comprising a display to display the composite image.

8. The video system of claim 4 where the first video signal portion overlays the second video signal portion.

9. A method, comprising:
receiving a first video signal;
clipping a second video signal to remove a portion of the second video signal;
scaling at least one of the first video signal and the clipped second video signal including deinterlacing the at least one of the scaled first video signal and the scaled clipped second video signal; and
merging the received scaled first video signal with the scaled clipped second video signal.

10. The method of claim 9 comprising displaying the merged image.

11. The method of claim 9 where merging includes overlaying the scaled clipped second video signal on the received scaled first video signal.

12. The method of claim 9 comprising storing the received first video signal or the second video signal in a memory.

13. The method of claim 9 where clipping the second video signal includes clipping a stock ticker.

14. A video system comprising:
means for receiving a first video signal;
means for clipping a second video signal to remove a portion of the second video signal;
means for scaling at least one of the first video signal and the clipped second video signal including means for deinterlacing the at least one of the first video signal and the clipped second video signal
means for merging the received scaled first video signal and the scaled clipped second video signal; and
means for displaying a composite image responsive to the means for merging.

15. The video system of claim 14 where the means for merging includes means for overlaying the scaled second video signal on the scaled first video signal.

16. The video system of claim 14 comprising means for storing the received first video signal or the clipped second video signal in a memory.

17. The video system of claim 14 where the clipped second video signal is a stock ticker.

18. An article comprising a storage medium, the storage medium having stored instructions, that, when executed by a machine result in:
receiving a first video signal;
clipping a second video signal to remove a portion of the second video signal;
scaling at least one of the first video signal and the clipped second video signal including deinterlacing the at least one of the first video signal and the clipped second video signal
merging the received scaled first video signal with the scaled clipped second video signal to generate a composite image; and
displaying the composite image on a display.

19. The article of claim 18 where merging includes overlaying the scaled clipped second video signal on the received scaled first video signal.

20. The article of claim 18 comprising storing the received first video signal or the clipped second video signal in a memory.

21. The article of claim 18 where the clipped second video signal is a stock ticker.

22. A system comprising:
a video port to receive a first video image and to clip a second video image from corresponding first and second video signals such that a portion of the second video image is removed;
an image scaler to scale the first video image and the clipped second video image; and
a processor to deinterlace the received first video image and the clipped second video image and to generate a composite image responsive to the scaled first video image and the clipped second video image, the received first video image overlaying the clipped second video image.

23. The system of claim 22 comprising a display to display the composite image.

24. The system of claim 22 comprising a memory to store the first received video image or the clipped second video image.

25. The system of claim 22 where the clipped second video image is a stock ticker.

* * * * *